May 26, 1959 L. IMBLUM 2,888,117
FLUID COUPLING
Filed Sept. 12, 1956 7 Sheets-Sheet 1

INVENTOR.
LEO IMBLUM
BY Manfred M. Warren
His Attorney

May 26, 1959 — L. IMBLUM — 2,888,117
FLUID COUPLING
Filed Sept. 12, 1956 — 7 Sheets-Sheet 3

FIG. 3

INVENTOR.
LEO IMBLUM
BY Manfred Warren
His attorney

May 26, 1959   L. IMBLUM   2,888,117
FLUID COUPLING

Filed Sept. 12, 1956   7 Sheets-Sheet 4

FIG. 4

INVENTOR.
LEO IMBLUM

May 26, 1959

L. IMBLUM 2,888,117

FLUID COUPLING

Filed Sept. 12, 1956

FIG_7

FIG_6

INVENTOR.
LEO IMBLUM
BY
His attorney

May 26, 1959  L. IMBLUM  2,888,117
FLUID COUPLING
Filed Sept. 12, 1956  7 Sheets-Sheet 7

FIG-9-

INVENTOR.
LEO IMBLUM

United States Patent Office 2,888,117
Patented May 26, 1959

2,888,117

FLUID COUPLING

Leo Imblum, Alameda, Calif.

Application September 12, 1956, Serial No. 609,436

12 Claims. (Cl. 192—59)

The invention relates to fluid coupling means such as employed in automotive transmission mechanisms. The present application is a division of my copending application Serial No. 500,332, filed April 11, 1955 for Automatic Transmission.

An object of the present invention is to provide a fluid coupling of the character described which will function in a smooth, quiet and positive manner, and wherein the parts are designed and constructed and operate to afford a balanced system of symmetrically applied forces enabling, in a minimum and usable size of unit, great strength, high power and direct transmission capacity, and extreme reliability and durability of the mechanism.

Another object of the present invention is to provide a fluid coupling of the character above which will have a high operating efficiency, and wherein fluid slippage and attendant loss of energy is confined entirely to the coupling and decoupling operation.

A further object of the present invention is to provide a fluid coupling of the character described which is adaptable for use in a transmission for shifting from one set of gears of one ratio to another set of gears of another ratio by means of fluid couplings in each set providing uninterrupted torque during the shifting operation.

The invention possesses other objects and features of advantage, some of which, with the foregoing, will be set forth in the following description of the preferred form of the invention which is illustrated in the drawings accompanying and forming part of the specification. It is understood, however, that variations in the showing made by the said drawings and description may be adopted within the scope of the invention as set forth in the claims.

The fluid coupling of the present invention is here shown in operative association with and as a part of the automatic transmission more fully shown and described in the parent application above noted. The transmission may be briefly characterized for present purposes as including input and output shafts 21 and 22, which carry a plurality of constantly enmeshed gear sets 23 and 24. 25 and 26, 27 and 28, 29 and 30, and 31 and 32, here providing five forward speeds, and reverse gears 33 and 34, which are normally not engaged but which may be enmeshed with a reverse idling gear 35; a plurality of fluid couplings more fully hereinafter developed connecting each of the gear sets to the shafts; and a hydraulic shifter valve which is arranged and constructed to control the operations of the several fluid couplings so that upon movement of the shifter valve in one direction the couplings will be energized and de-energized to selectively engage the gear sets in the order of increasing gear ratio, and upon movement in the opposite direction through such positions the gear sets will be engaged in the order of decreasing gear ratio.

Figure 3:
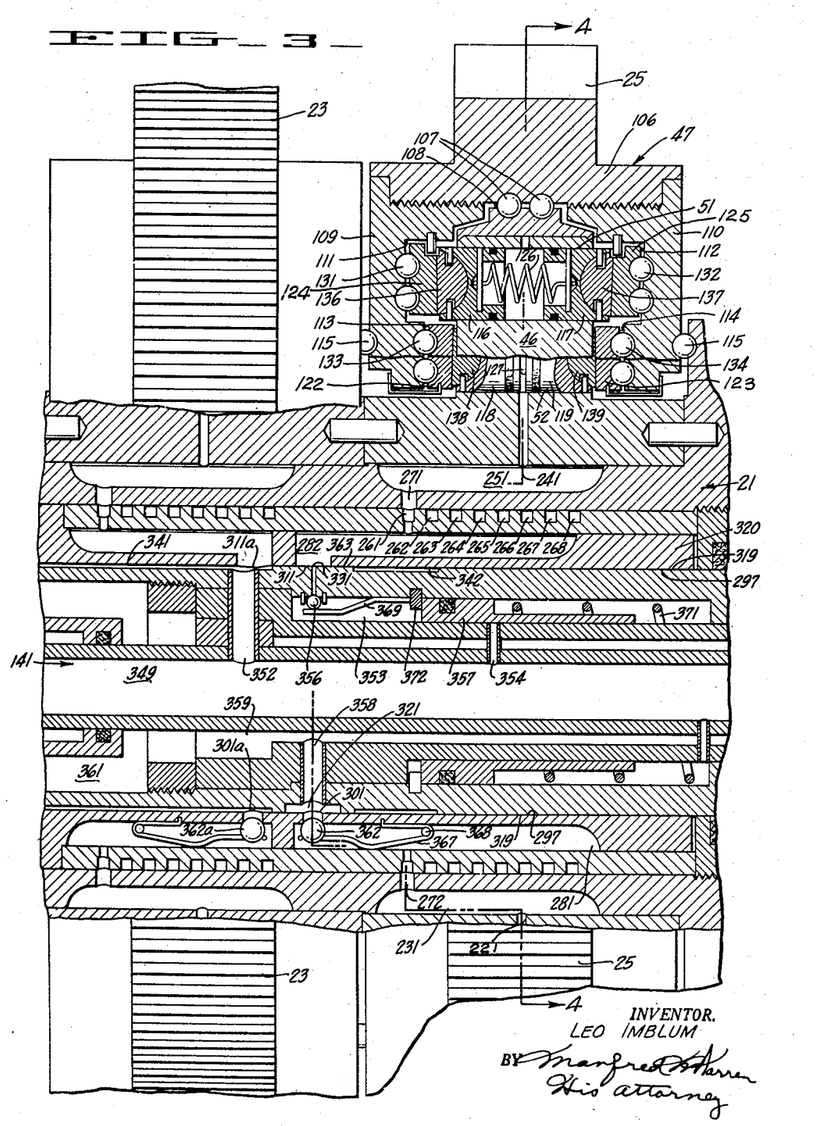
Figure 3 is an enlarged fragmentary cross sectional view of a portion of the transmission showing the fluid coupling, the view being taken substantially on the plane of line 3—3 of Figure 4.
Figure 4:
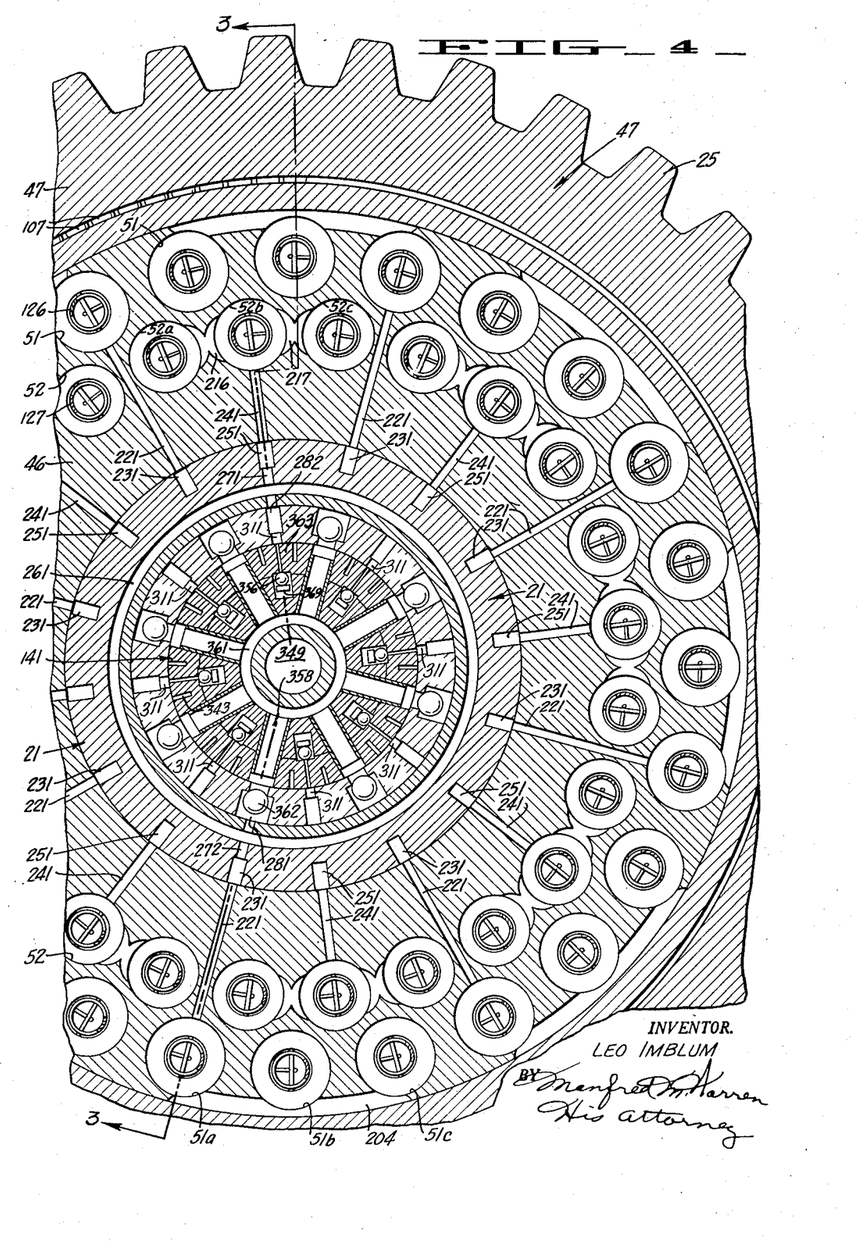
Figure 4 is a fragmentary cross sectional view of the transmission taken substantially on the plane of line 4—4 of Figure 3.

In the transmission as illustrated, there is one gear in each of the sets of the constantly enmeshed gears which is journaled for free rotation on either the input or the output shafts, and the connection of this latter gear and shaft is under the control of a fluid coupling so that one fluid coupling is provided for each of the gear sets and controls the operation thereof. A typical showing of the fluid couplings of the present invention will be best seen in Figures 3 and 4, and a description of this unit will suffice for all of the units. As will be seen from these figures, the couplings consist briefly of concentrically arranged and relatively rotatable drive and driven members 46 and 47, the former being mounted upon and keyed to the input shaft 21 for rotation therewith, and the latter including gear 25 which is enmeshed with gear 26 carried for rotation on the output shaft 22. Accordingly, it will be understood that so long as member 47 is freely rotatable on member 46, no drive connection between the input and output shafts will be effected by the enmeshed gears 25 and 26, but upon the restraining of members 46 and 47 for joint rotation, and to the extent that they are so restrained, the drive connection will be effected between shafts 21 and 22 through enmeshed gears 25 and 26. The member 46 is here of generally disk shape and is formed with concentric banks of circumferentially spaced axially extending open-ended cylinders 51 and 52, the cylinders 51 in the outer bank here being twenty-four in number of which seventeen are shown in Figure 4 where seven identically constructed cylinders in the outer bank are deleted to obtain an adequate scale drawing. The cylinders 52 in the inner bank are likewise twenty-four in number, of which eighteen are shown in Figure 4 where six identically constructed cylinders in the inner bank are deleted in the interests of clarity of illustration. The outer gear carrying member 47 is preferably of channel shaped annular form having a circumferentially extending wall 106, which is journaled as by means of bearings 107 on the outer periphery 108 of the member 46 and is provided with inwardly projecting flange-like, axially spaced annular cam walls 109 and 110 having pairs of axially opposed cam faces 111 and 112, and 113 and 114 in juxtaposition to the opposite ends of the two banks of cylinders 51 and 52 respectively. In accordance with the present invention and as may best be seen in Figure 5, the cam faces 111—114 are inclined to the axis, and the faces of each of the pairs are out of phase so as to approach and recede from the cylinder ends upon relative rotation of the members. Mounted for reciprocation in each of the cylinders 51 and 52 are pairs of opposed pistons 116 and 117 (in the case of cylinders 51) and 118 and 119 (in the case of cylinders 52), the pistons, in their extended positions, being engaged with and displaced by ring shaped bearing races 122, 123, 124 and 125 forming part of ball thrust bearings 131, 132, 133 and 134 running on the cam faces 111—114.

Figures 1, 8:
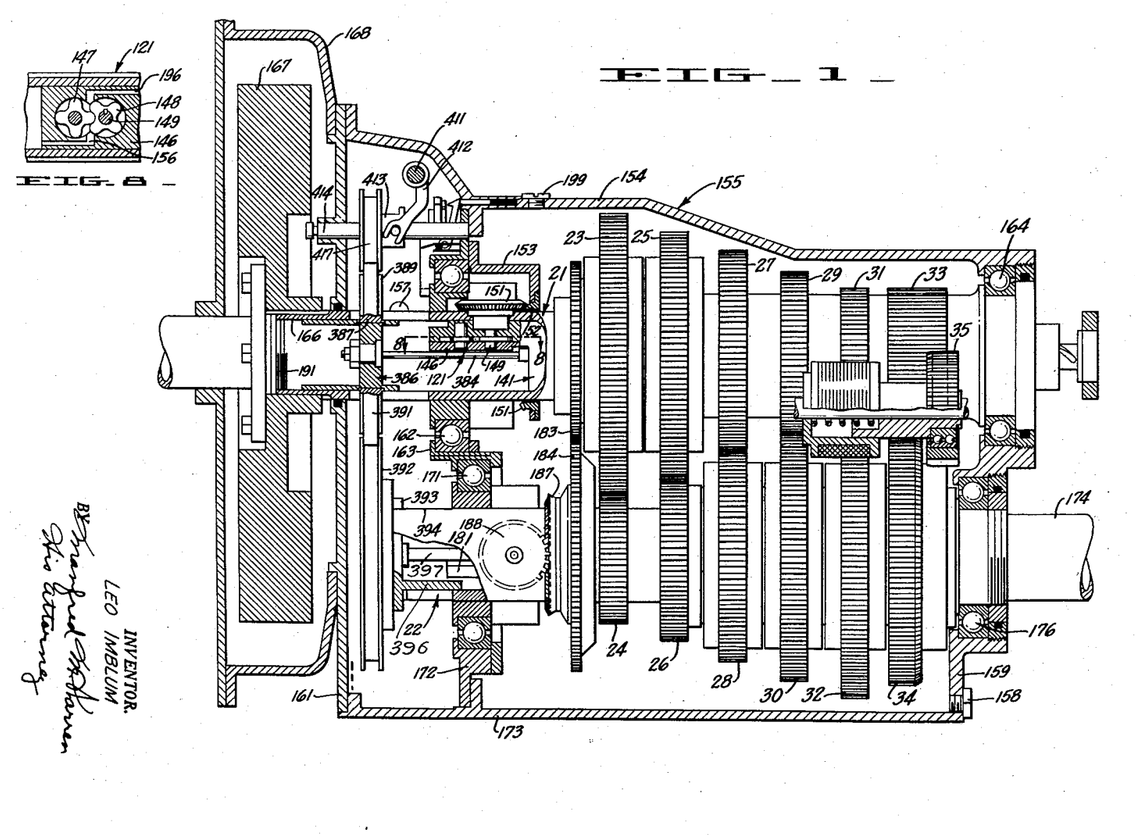
Figure 1 is a longitudinal vertical sectional view of an automatic transmission more fully illustrated and described in my parent application aforesaid and incorporating a fluid coupling constructed in accordance with the present invention.
Figure 8 is a fragmentary cross sectional view of one of the pumps shown in Figure 1 and is taken substantially on the plane of line 8—8 of Figure 1.

A fluid pump 121 shown in Figures 1 and 8 is operatively connected to the cylinders and functions to supply fluid under pressure therein between the pistons 116—119, to cause movement of the pistons against the cam faces 111—114 to apply coupling torque between the members 46 and 47; and as a feature of the present construction, the undulations of the pairs of cam faces 111—114 for the different banks are circumferentially staggered so that the coupling torque will be applied uniformly at circumferentially spaced positions around the axis of members 46 and 47. The fluid used in the couplings is an incompressible liquid such as petroleum oil so that upon filling of the cylinders 51 and 52 with fluid, and upon locking of the fluid therein, the pistons will be locked in their outwardly extending position against the cam faces 111—114, and a solid geared connection is effected between the input and output shafts 21 and 22 through gears 25 and 26. Preferably the cams 109, 110 are constructed as separate, annular plates secured as by threading at their outer periphery to wall 106, thereby permititng some resilient flexing of their cam surfaces in an axial direction. Such flexing is limited by bearings 115 here located between the several axially spaced units. Preferably ball bearings are used generally throughout and at positions requiring high speeds. I prefer to interpose nylon or other non-metallic balls between the metal balls so as to eliminate sparking and erosion of the balls by reason of high speed metal to metal frictional contact.

Figure 5:
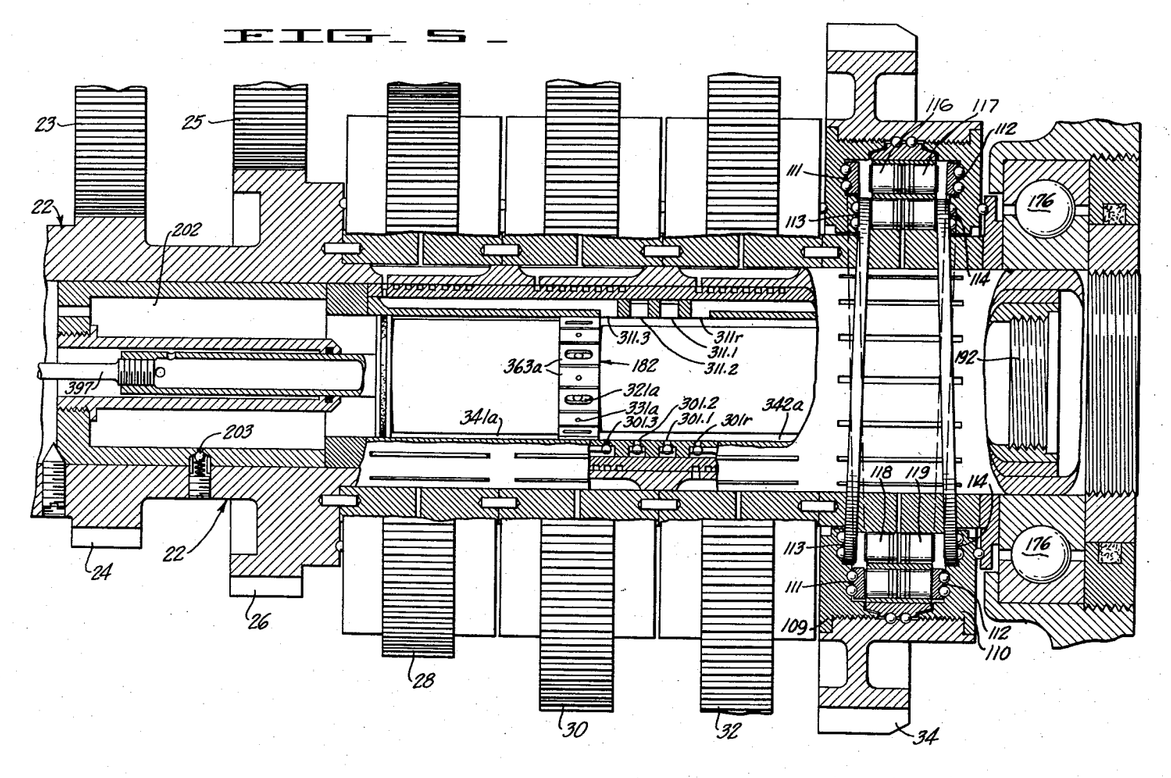
Figure 5 is a longitudinal sectional view of a lower portion of the transmission.
Figure 6:
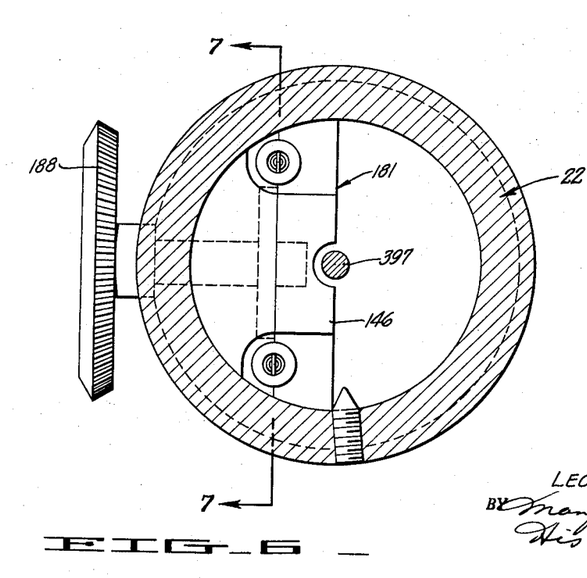
Figure 6 is a cross sectional view of a pump part of the transmission shown in Figure 1, the view being taken on substantially the plane of line 6—6 of Figure 7.
Figure 7:
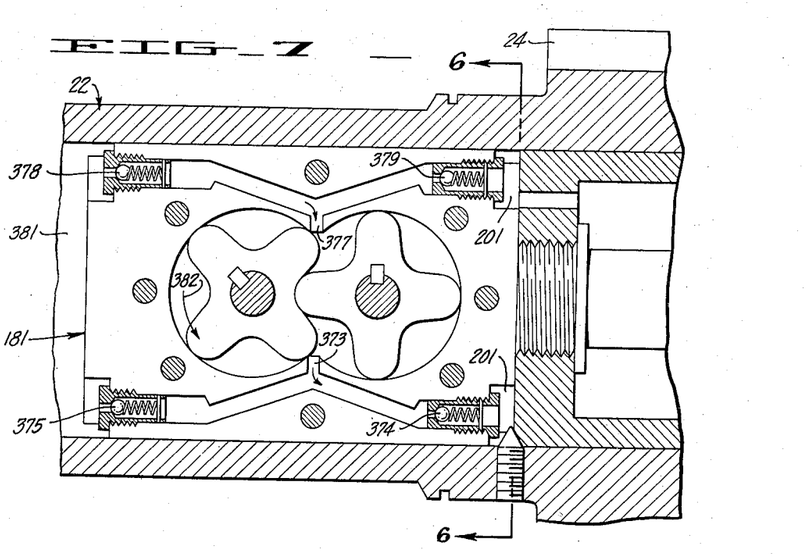
Figure 7 is a cross sectional view of the fluid pump shown in Figure 6 and is taken substantially on the plane of line 7—7 of Figure 6.

As another important feature of the fluid coupling of the present invention, spring means is provided for normally holding the pistons 116—119 in retracted position away from the cam faces so that in the absence of fluid pressure in the cylinders 51 and 52, the members 46 and 47 will be fully and completely decoupled and move freely relatively to each other on the bearings 107. Such spring means here consists of a helical spring 126 mounted in tension between each of the pairs of pistons 116 and 117 in the outer bank of cylinders 51, and a helical spring 127 similarly mounted in tension between each pair of pistons 118 and 119 mounted in the inner bank of cylinders 52, the springs operating in each case to normally urge the pistons to inwardly retracted position free from engagement with the bearing races 122—125. During coupling and decoupling operation frictional losses are reduced by the provision of the annular bearings 131—134, the connection between the pistons and the bearing races here being effected to permit necessary articulation, by parts 136, 137, 138, and 139 having swivel connections in the head ends of pistons 116—119 and engaged with the bearing races as illustrated in Figures 3 and 5.

The operable connection of the pump 121 to the cylinders 51 and 52 and the release of fluid from the cylinders are under the control of a shifter valve 141. In accordance with the present invention and as a principal feature thereof, the drive shaft 21 is made of hollow tubular form, and the pump 121 and the shifter valve 141 are both mounted within the shaft so that the entire fluid systems are centrally contained within the shaft 21 and the surrounding cylinder block member 46 of the fluid coupling, whereby the making of fluid connections in the rotating system is greatly simplified, and seal problems substantially eliminated.

As will be seen from Figures 1 and 8, pump 121 consists of a pump housing 146 mounted internally of shaft 21 and for rotation therewith, and which contains enmeshed pump gears 147 and 148, the latter of which is driven by a shaft 149 projecting radially outwardly from shaft 21 for connection at its outer end with a drive gear 151 engageable with a stationary bevel gear 152 carried by a bracket 153 extending from the the top wall 154 of the transmission housing 155. A fluid level is maintained in the housing 155 above the shaft 21 so that the pump housing 146 and its intake passage 156 is constantly immersed in the fluid. The fluid level is normally maintained to the height of a plug 157 in the case and may be drained from a plug 158 provided at the base of one of the end walls 159 of the housing. With further reference to the details of construction of transmission housing 155, it will be noted that the drive shaft 21 extends longitudinally between the opposite end walls 159 and 161 and is journaled for rotation in a front bearing 162 carried by a bearing cage 163 and at its opposite rear end in a bearing 164 integrally housed by the end wall 159. The forward end 166 of the drive shaft projects externally of end wall 161 for connection to the flywheel 167 of the engine. A bell housing 168 secured to the forward end wall 161 serves to attach the transmission case to the engine. The driven or propulsion shaft 22 is mounted in parallel relation to drive shaft 21 and extends longitudinally between the forward end wall 161 and the rear end wall 159. It is journaled at its forward end in bearing 171 carried by bearing cage 172, which is in turn supported on the bottom wall 173 of the housing. The rear end 174 of the output shaft is journaled in a bearing 176 integrally housed in the end wall 159 and projects rearwardly from the wall 159 for connection to the drive shaft of the automotive vehicle or other part or piece of equipment to be driven.

The main drive shaft 21 carries the driving gears 23, 25, 27, 29 and 31 constituting the drive gears for the five forward speeds provided by the present transmission and also carries gear 33 used for reverse drive. As above noted, gears 23, 25, 27, 29 and 31 are in constant mesh with gears 24, 26, 28, 30 and 32 carried by the driven or propulsion shaft 22, and a fluid coupling unit is incorporated in one of the gears making up each set. Since a progressive decrease in gear diameter is desired along the length of shaft 21 while contrariwise a progressive increase in diameter of gears is provided along the length of the output shaft 22, it is convenient to place certain of the fluid drive units in the gears on both shafts, that is to incorporate the fluid drive in the largest diameter gears on these shafts. Thus, in accordance with the present construction a fluid coupling is incorporated in the hubs of gears 23 and 25 on the drive shaft 21, and in the hubs of gears 28, 30, 32 and 34 mounted on shaft 22. Consistent with this arrangement the output shaft 22 is formed with a hollow tubular construction in the same manner as drive shaft 21, see Figures 1, 5, 6 and 7, and carries an internally housed gear pump 181 and shifter valve 182. Gear pump 181 is driven by a gear 183 carried by the drive shaft. As will be seen in Figure 1, gear 183 is enmeshed with gear 184 which is journaled for rotation on the shaft 22, and which carries with it for rotation a bevel gear 187, which is in constant mesh with the drive gear 188 for pump 181 in the same manner as the driving connection for pump 121. As will be understood from the foregoing, gear pump 121 carried by drive shaft 21 is in rotation as long as the engine of the vehicle is in operation and under such circumstances is driven by the stationary gear 152. Also, during operation of the engine and rotation of shaft 21, gear 183 carried thereby constantly drives gears 184 and 187 on the output shaft 22 and accordingly drives the pump gear 188 for supplying fluid under pressure to the shifter valve in the propulsion shaft. The gear ratios effecting pump operation are selected so as to insure rotation of the pump gear 188 and a supply of fluid pressure in the output shaft 22 under all operating conditions (speeds of rotation) of the output shaft when fluid pressure is required therein for operating any of the fluid couplings carried thereby. The ends of the hollow shafts 21 and 22 projecting from the end walls 161 and 159 of the housing are appropriately sealed by plugs 191 and 192.

Figure 2:
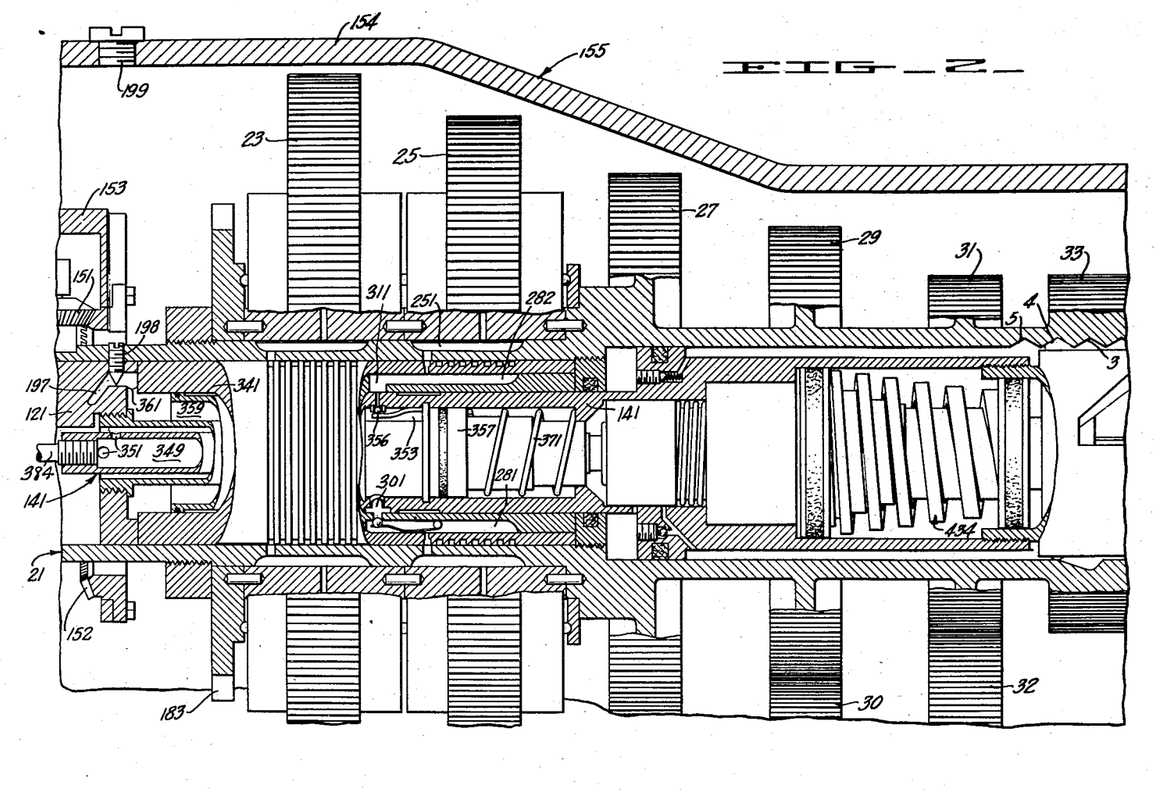
Figure 2 is an enlarged fragmentary longitudinal sectional view of the upper portion of the transmission.

The discharge port 196 of pump 121 is connected to a pump pressure fluid passage 197 in the shaft 21, see Figure 2, from whence the fluid is picked up by the shifter valve 141 and carried longitudinally internally of the main or drive shaft 21 to service the cylinders of the fluid couplings on the main shaft as well as for the automatic controls later to be described. As understood, the discharge pressure of pump 121 will vary as a function of the speed of the input shaft 21, and this function is utilized in several important ways in the present transmission. It is also desirable to be able to adjust the fluid pressure particularly to compensate for wear of the pump, and for this purpose a pressure control valve 198 is here provided in the shaft 21 and in pump pressure passage 197. Access to valve 198 for adjustment may be had through a closure plug 199 provided in the top wall 154 of the housing in the plane of rotation of the valve 198.

In a similar manner the discharge port 201 of the fluid pump 181 carried in the output shaft 22 is connected to a main pump pressure fluid distributing passage 202 extending longitudinally through the shaft 22 for supplying the fluid couplings carried by the propulsion shaft, see Figure 5. The output pressure of pump 181 also varies with the speed of the drive shaft 21 and the propulsion shaft 22, and preferably a pressure limiting valve 203 is carried by the propulsion shaft in the fluid passage 202.

The arrangement of the cylinders 51 and 52 of each of the fluid couplings together with their fluid connections is best seen in Figure 4 of the drawings. As will be noted the cylinders in the outer bank are connected in groups of three cylinders 51a, 51b, and 51c for each group making eight groups in all spaced 45 degrees apart circumferentially around the cylinder block member 46. To accomplish this arrangement, a circumferentially extending passage 204 is provided for the cylinders 51a, 51b and 51c comprising each group to connect the cylinders of the group. In a similar manner, the cylinders in the inside bank are connected together in groups of three 52a, 52b and 52c, thus providing eight groups of cylinders spaced circumferentially apart by 45 degrees in the same manner as the groups of cylinders in the outer bank. As will be noted, passages 216 and 217 connect the cylinders 52a, 52b and 52c together as a group, and like passages are provided to connect the other seven groups of inside cylinders.

Each of the groups of cylinders is connected by an individual fluid circuit. Eight radially extending passages 221 connect the eight groups of cylinders in the outside bank to eight circumferentially spaced longitudinally extending passages 231 in the main shaft 21. In a similar manner the eight groups of cylinders in the inside bank are connected by eight radial passages 241 to eight circumferentially spaced longitudinally extending passages 251 in the drive shaft 21. As will be seen from Figure 4, the radial passages 241 for the inner bank of cylinders are spaced circumferentially between the radial passages 221 for the outer bank of cylinders. Preferably all of the longitudinally extending passages 231 and 251 are arranged in circumferentially spaced relation equally distant from the center of the shaft and positioned with the longitudinal passages 231 servicing the outside bank of cylinders spaced circumferentially between the longitudinal passages 251 servicing the inside bank of cylinders.

In accordance with the present invention, each pair of opposed cam faces 111—112 and 113—114 provide one undulation or cycle for each revolution; for example with reference to Figures 3 and 5 it will be seen that the opposed cam faces 111—112 are at their widest point at the top of the views so that the opposed pistons 116 and 117 will be forced together upon relative displacement of the members 46 and 47 through 180 degrees of rotation from the position illustrated in the figures, and such pistons will complete one cycle of reciprocation reaching their outermost and innermost positions during one complete revolution of relative movement between members 46 and 47. In a similar manner, opposed cam faces 113—114 are illustrated at their narrowest position at the top of the views and at their widest apart position at the bottom of the views, thus placing these cam faces substantially 180 degrees out of phase with cam faces 111—112. In this fashion, diametrically equal forces are created around the axis of the fluid coupling unit so that the stresses are distributed. This circumferential distribution of forces around the axis of the unit coupled with the axially opposed forces of the pistons themselves enable the construction of a compact, strong and balanced unit of relatively very high torque and power transmitting capabilities.

Cooperating with the diametrical out of phase relation of the two pairs of cam faces, the fluid circuit is arranged to connect the diametrically opposed groups of cylinders in the inner and outer banks for joint operating. Thus cylinders 51a, 51b and 51c of the outside bank are connected to diametrically opposed cylinders 52a, 52b and 52c of the inside bank and the pistons in these two groups of cylinders will simultaneously apply their torque generating gripping actions. It is desirable that only the diametrically opposed groups of inner and outer cylinders be connected together so as to avoid a pumping action of fluid between the cylinders. To accomplish this connection of diametrical groups, while isolating them from each of the other connected groups, there is provided at the inner side of the longitudinal passages 231 and 251, Figure 3, a series of eight axially spaced annular fluid collecting rings 261—268, one in number for each of the cylinder groups. Each of the eight longitudinal passages 251 (for the inner cylinders) is connected to one of the collector rings 261—268 by a radial passage 271 and each of the eight longitudinal passages 231 (for the outer cylinders) is connected to the same collector rings 261—268 by radial passages 272 thereby placing the diametrically opposed pairs of groups of cylinders in the inner and outer banks in common fluid connection. For example with reference to Figure 4, it will be seen that cylinders 51a, 51b and 51c in the outer bank of cylinders at the bottom of the view are jointly connected by circumferential passage 204, by radial passage 221, longitudinally extending passage 231, radial passage 272 to collector ring 261. At the opposite (upper) side of the cylinder block, the opposed group 52a, 52b and 52c of inner cylinders are jointly connected by passages 216 and 217, radial passage 241, longitudinal passage 251, radial passage 271 to collector ring 261 thereby placing the upper group of cylinders 52a, 52b and 52c in common fluid connection with the lower group of outside cylinders 51a, 51b and 51c. In an identical manner each remaining group of diametrically opposed cylinders is connected to one of the collector rings 262—268.

In the case of the main drive shaft 21 here two fluid coupling units are provided in the hubs of gears 23 and 25; it is desirable that the fluid passages for the hydraulic cylinders for both of the couplings be brought longitudinally through the shaft to a common valving station so that the charging and discharging of these cylinders to control the operation of the fluid coupling units may be conveniently effected by relatively short strokes of a common selector or shifter valve 141. To do this and to provide for individual intake and discharge passages for each of the eight connected groups of cylinders, the eight collector rings 261—268 are connected to sixteen inwardly positioned and circumferentially spaced longitudinally extending passages (a pair 281 and 282 for each collector ring, see Figures 3 and 4), which are in turn connected to the interior peripheral wall 297 of the drive shaft 21 in a series of eight inlet ports 301 and eight discharge ports 311 which open to the wall in a common transverse plane. The fluid collector rings for the other fluid coupling on the shaft are similarly brought to a series of sixteen circumferentially spaced inlet and discharge ports located in a common transverse plane axially adjacent to the transverse plane of the ports 301 and 311, as shown at 301a and 311a.

The shifter valve 141 is here of cylindrical form having an external periphery 319 slidably mounted for reciprocation on the internal wall 297 of a sleeve 320 carried internally by the shaft, and the valve is provided in a common transverse plane with sixteen circumferentially spaced ports comprising eight pump pressure ports 321 which are spaced for registration with the inlet ports 301, and eight reservoir connected ports 331 positioned for registration with the shaft discharge ports 311 for receiving fluid from the cylinders for return to the reservoir (here represented by the transmission housing) under special circumstances later described. Normally, the evacuation of the cylinders is effected by a pair of axially spaced, annular reservoir connected valve ports 341 and 342 which are inter-connected by passages 343 (see Figure 4) and are arranged for registration with the discharge ports 311 in axially displaced positions of the shifter valve. As here shown, the shifter valve is provided with a central hollow core 349, which opens by way of a port 351, see Figure 2, to the hollow interior of the shaft 21 from whence fluid may pass into the housing and to the suction side of pump 121. The reservoir passage 349 is connected to the valve ports 341 and 342 by a radial passage 352, see Figure 3. The secondary valve reservoir ports 331 are connected to the main reservoir passage 349 by way of a longitudinally extending valve chamber 353 provided in the shifter valve and connected adjacent one end to port 331 and medially of its length by radial passage 354 to the center core passage 349. In normal operation, ports 331 are closed by a spring loaded check valve 356 in the chamber 353 and passage 354 is closed by a spring loaded slide valve 357 also in the chamber 353. Connection of the pump pressure valve ports 321 is effected by a series of radial passages 358 which extend from the ports inwardly to a longitudinally extending annular pump pressure fluid passage 359, which extends longitudinally of the shifter valve and is connected by port 361 at the end of the shifter valve to the pump pressure passage 197 in the drive shaft, see Figure 2. Fluid under pressure is thus supplied by pump 121 to the pump pressure passage 359 in the shifter valve and through the eight radial passages 358 to the pump pressure ports 321 and thence outwardly through the aligned ports 301 in the shaft and the registering passages 281 leading to the cylinders.

As an important feature of the present construction a unidirectional valve means is provided in the last mentioned intake passages so that fluid will flow only in an outward direction in these passages to the cylinders and return flow from the cylinders will be checked. For this purpose a ball check valve 362 is provided in the eight intake passages 281 for the cylinders. In this manner fluid supplied under pressure to the cylinders will urge apart the pistons therein into coupling relation with the cam faces, and release of the fluid, to permit retraction of the pistons, is solely and exclusively under the control of discharge passages 282 and their ports 311.

Figure 9:
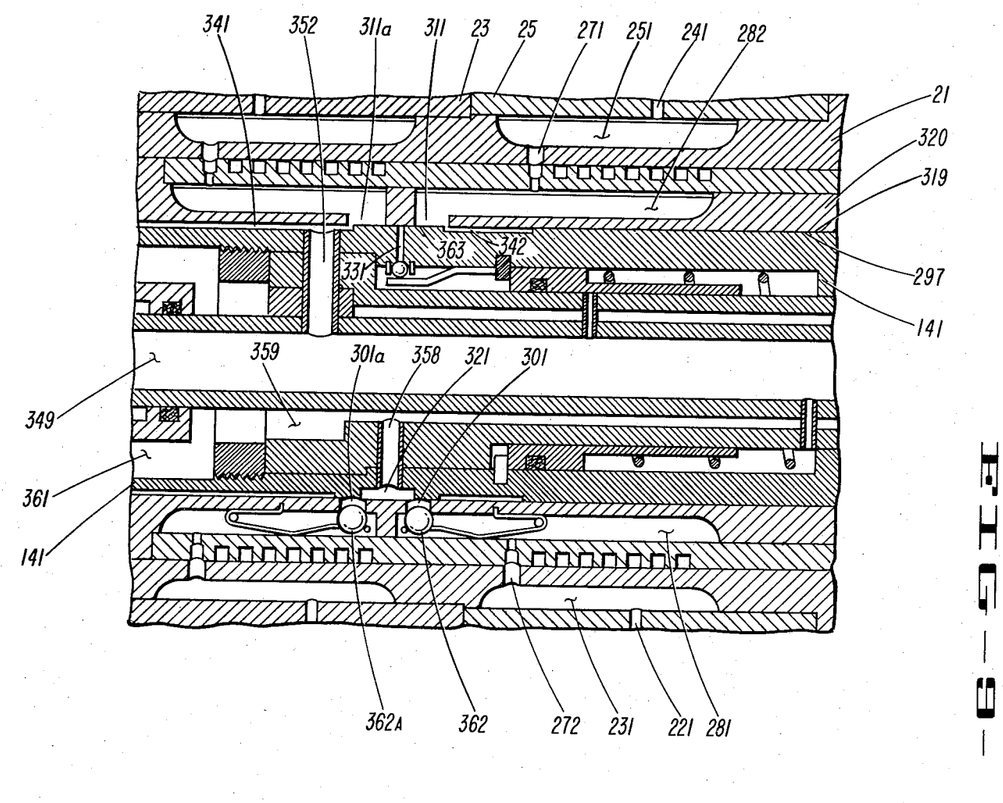
Figure 9 is a longitudinal fragmentary cross-sectional view similar to Figure 3 but showing the parts in a different position.

With reference to Figure 3, the shifter valve is in position placing its pump pressure ports 321 in registration with the shaft inlet ports 301 whereby fluid under pressure is passed to the cylinders of the fluid coupling contained in gear 25. At the same time, a land 363 on the slide valve between reservoir ports 341—342 covers the cylinder discharge ports 311 with the exception that the valve ports 331 formed in the land are in registration but are closed by valves 356 and 357. In this condition, the pistons in the cylinders are forced outwardly into full coupling engagement with the cam faces 111—114, and joint rotation of the gear 25 and the drive shaft is effected. At the same time, valve reservoir port 341 is connected to the discharge ports 311a of the adjacent fluid coupling for gear 23. Pistons in this fluid coupling are accordingly retracted by their springs 126 and 127 away from the cam faces whereby gear 23 is journaled for free rotation on the drive shaft. As the shifter valve is moved to the left, from the position illustrated in Figure 3, and as shown in Figure 9, valve land 363 starts to close off the discharge ports 311a; and upon further movement pump pressure valve ports 321 start into registration with the inlet shaft ports 301a for the fluid coupling for gear 23. Fluid pressure thus opens the check valve 362a for the second fluid coupling and starts the fluid flow into the cylinders for urging apart the pistons therein. While the second coupling is taking hold, these pistons reciprocate in their cylinders as relative rotation between the coupling members takes place, the discharge of the cylinder fluid being permitted by the restricted but still open discharge ports 311a. As the shifter valve is moved further to the left, the discharge ports 311a are gradually closed off so as to lock the pistons against reciprocation and thereby fully couple the members. In all of the latter positions, the supply of fluid under pressure is maintained to the cylinders so as to constantly replenish any leakage which takes place and return movement of the fluid through the pump pressure passage is stopped by check valve 362a.

During the course of progressive energizing of the second fluid coupling, as above described, the first fluid coupling is progressively de-energized so that a smooth transition takes place from one to the other. As will be observed from Figure 3, the shifter valve on moving to the left progressively moves land 363 away from ports 311 while progressively bringing reservoir port 342 into registration therewith; and at the same time first maintaining connection of the pump pressure ports 321 and the shaft inlet ports 301 and thereafter closing off ports 321 so as to thereby slowly and progressively release increasing quantities of fluid from the cylinders of the first fluid coupling and effect gradual decoupling thereof. To further smooth out the transition from one fluid coupling to another, the discharge ports 311 may be formed of diamond shape elongated axially of the shaft as depicted in my parent application aforesaid.

As will be understood the transmission of torque between the coupled members accomplished by the closing off of the discharge ports 311 generates hydraulic pressure within the circuits of the fluid coupling, which is retained by check valves 362 and pressure control valves 356 and 357 thereby locking the pistons against the cam faces. Since the cam faces are flat over 360 degrees, four of the circuits will operate in compression while their pistons are being driven inwardly by the converging cam faces. The other four circuits operate on their fluid charging strokes wherein fluid is applied through the check valves 362. Pistons operating inwardly along the slopes of the cams remain under compression until the end of the converging slopes at which point the pistons are forced outwardly against the divering cam slopes and under such circumstances change from pressure producing to pressure receiving status, which continues until the pistons reach the ends of the divergent cam slopes, at which point they again enter the compression convergent phase of the operation. After full closing of the cylinder discharge passages, the pistons will remain static for normal load conditions, except for leakage and the imposition of sudden high loads later described. The occurrence of leakage will only cause slow creeping action of the pistons as successive groups of pistons are slowly advanced over the convergent cam slopes providing at all times continuous torque transmission.

As will be best observed from Figure 4, the fluid pressure ports 311 are equally spaced around the circumference of the shifter valve 141 so that when these ports are under pressure during transmission of torque there is a symmetrical centralizing application of fluid pressure to the periphery of the shifter valve resulting in very easy longitudinal movement of the valve.

Since the check valves 362 are mounted in the shaft for radial movement, they are subject to opening action by centrifugal force. Accordingly, it is desirable to provide some means for counterbalancing these check valves so as to hold them closed at all shaft speeds. As here shown, leaf type springs 367 are used for urging valves 362 to their seats and weights 368 are mounted on cantilever arm portions of the springs for counterbalancing the valves 362.

As an important feature of the present transmission, the valves 356 and 357 provide means for controlling the release of fluid from the cylinders and thereby function to limit the torque applied. A sudden load thrown on to the fluid coupling, such as by rapid down shifting, compression braking of the vehicle, or the like will increase the fluid pressure in the circuits sufficient to force open valve 356, against the resistance of its closing spring 369, which renders the valve pressure responsive. An instantaneous high load will simply pop open valves 356 and squirt minute quantities of fluid into valve chamber 353, the valves 356 functioning to snap closed as soon as the instantaneous load passes. If the over load is sustained, valves 356 will remain open, more fluid will be discharged into valve chamber 353 and slide valve 357 will be moved against the resistance of its closure spring 371, until the valve uncovers passage 354 thereby venting valve chamber 353 to the reservoir passage 349. Upon passing of the over load, spring 371 will restore valve 357 in closing relation against passage 354, as illustrated in Figure 3, the valve 357 having a predetermined clearance to permit such return and being normally retained in returned position against a stop 372.

As above described, gear pump 181 is normally operated by the engine drive shaft 21 and, as will be understood, the gear type pump is inherently unidirectional in its operation. In accordance with the present invention means is provided for rendering pump 181 effective to energize the fluid couplings when for example it is desired to start a dead engine by pushing of the vehicle. In such case, gear 187, entrained to the engine shaft, is stationary, and rotation of the propulsion shaft 22 causes rotation of pump gear 188 in a normally reverse direction. Accordingly, in the present invention a multiway valve system is employed, see Figures 6 and 7, for obtaining a unidirectional flow of fluid to the fluid couplings, regardless of the direction of rotation of the gear 188. The normal discharge chamber 373 of the pump is provided with two check valves 374 and 375 arranged to transmit fluid away from the chamber 373 and for a reverse flow respectively. The normal suction chamber 377 for the pump is provided with two check valves 378 and 379 which permit flow into the chamber and a reverse flow respectively. Valves 374 and 379 are connected to pump discharge passage 201 and valves 375 and 378 are connected to pump intake passage 381. Accordingly, in the normal direction of rotation of the pump, as indicated by arrow 382, fluid is drawn into chamber 377 through check valve 378, and fluid is discharged from chamber 373 through valve 374. Upon rotation of the pump gears in reverse direction, fluid is drawn into chamber 373 through valve 375 and is discharged from chamber 377 through valve 379.

In accordance with the present transmission a common connection is effected between the shifter valve 141 mounted within the drive shaft 21 and the shifter valve 182 carried by the output shaft 22, so that these two valves move together longitudinally of their respective shafts through a plurality of positions successively engaging the fluid couplings mounted within gears 34, 32, 30, 28, 25 and 23. As will be best seen from Figure 1, the shifter valve 141 is connected by an axially extending rod 384 to a crosshead 386 slidably mounted for reciprocation within the shaft 21. The crosshead is provided with radially extending arms 387, which project through and are slidably carried by elongated slots provided in the shaft. The arms support a surrounding disk-like member 389, which has a channel shaped periphery and is connected by bearing 391 to a disk-like member 392 similarly carried by the output shaft 22. Member 392 is connected to shifter valve 182 by radial arms 393 carried in elongated slots 394 in the output shaft and secured to a similar crosshead 396 which is in turn secured by an axial rod 397 to shifter valve 182. In this manner joint axial movement of the shifter valves is effected by their common connection at bearing 391, while these valves and their supporting shafts 21 and 22 are permitted to rotate at different speeds and in different directions.

The foregoing movement of the shifter valves may be effected either manually or automatically, and in my parent application aforesaid, both and conjoint movements are provided. Manual operation may be here effected by rotary displacement of shaft 411 journaled in the case 155 for the transmission. A crank 412 is carried by the shaft 411 and is formed with bifurcated ends pivoted to a trunnion 413 carried on a slide shaft 414. The trunnion also here journals a surrounding ring member 417 which is connected by bearing 391 to the periphery of the disk member 389. As will be observed, the foregoing structure provides a common movement between the shifter valves and the rotary shaft 411, and accordingly this shaft may be used to shift the transmission to any of the gear seats, or, conversely, displacement of the shifter valves by the automatic means (see parent application) will cause a correlated movement of the operating shaft 411.

For further reference to the transmission and the coordinated operation of the fluid coupling therein reference is made to the parent application.

I claim:

1. In a coupling of the character described, concentrically arranged and relatively rotatable drive and driven members, one of said members being formed with concentric banks of circumferentially spaced axially extending open ended cylinders, the other of said members having a pair of axially opposed annular cam faces extending across said cylinder ends of each bank and being inclined to the axis and out of phase so as to jointly approach and recede from said cylinder ends upon relative rotation of said members, a pair of opposed pistons mounted for reciprocation in each of said cylinders and engageable with said cam faces, and means connected to said cylinders and functioning to supply fluid under pressure therein between said pistons to cause movement of said pistons against said cam faces to apply coupling torque thereto, the undulation of the pairs of cam faces for different banks being circumferentially staggered so that the coupling torque will be applied at uniformly circumferentially spaced positions around the axis of said members.

2. In a coupling of the character described, a hollow shaft, concentrically arranged and relatively rotatable drive and driven members, the inner of said members being mounted on said shaft and being formed with circumferentially spaced axially extending open ended cylinders, the outer of said members being of channel shape and having a pair of inwardly projecting axially opposed annular cam faces extending across said cylinder ends and being inclined to the axis and out of phase so as to jointly approach and recede from said cylinder ends upon relative rotation of said members, a pair of opposed pistons mounted for reciprocation in each of said cylinders and engageable with said cam faces, a fluid pump mounted within said shaft and connected to said cylinders for supplying fluid under pressure therein between said pistons to cause movement of said pistons against said cam faces, and a valve mounted within said shaft for controlling the introduction of fluid into said cylinders and the release of fluid from said cylinders to thereby control the coupling torque applied between said pistons and cam faces.

3. In a coupling of the character described, a hollow shaft, a generally disk-shaped cylinder block member mounted concentrically on said shaft for rotation therewith and formed with a plurality of circumferentially spaced axially extending cylinders opening to the opposite radial sides of said member, a second channel shaped member supported for rotation around the outer periphery of said block member and having inwardly projecting axially spaced annular cam faces in juxtaposition to the opposite ends of said cylinders and being inclined to the axis and out of phase so as to approach and recede from said cylinder ends upon relative rotation of said members, a pair of opposed pistons mounted for reciprocation in each of said cylinders and engageable with said cam faces, said cylinder block member being formed with inlet and discharge passages connected to said cylinders substantially centrally thereof between said pistons and being connected to spaced ports at the interior of said shaft, spring means connecting each pair of pistons for normally holding said pistons in retracted position in each of said cylinders away from said cam faces, a fluid pump mounted within said shaft for supplying fluid under pressure, and a slide valve mounted within said shaft for reciprocation to and from said ports for introducing fluid under pressure into said cylinders to cause movement of said pistons against said cam faces against the resistance of said spring means and for controlling the release of fluid from said cylinders to thereby determine the coupling torque applied between said pistons and cam faces.

4. A coupling as characterized in claim 2 and having a fluid reservoir, and wherein said valve is formed with an internal valve chamber, a first pressure responsive valve carried by said first-named valve and connecting said cylinders with said internal valve chamber for limiting the coupling torque between said pistons and cam faces, a spring biased slide valve mounted in said internal chamber and providing a pressure responsive variable volume pressure chamber, said valve functioning to hold increasing pressure in said chamber up to an elevated pressure substantially greater than the opening pressure of said first pressure responsive valve and at said elevated pressure functioning to vent said chamber to said reservoir.

5. In a coupling of the character described, a hollow shaft, concentrically arranged and relatively rotatable drive and driven members, the inner of said members being mounted on said shaft for rotation therewith and being formed with a plurality of circumferentially spaced axially extending open ended cylinders and being formed with passageways connecting each of said cylinders to spaced inlet and discharge ports at the inside periphery of said shaft, the outer of said members being channel shaped and having a pair of inwardly projecting axially opposed annular cam faces extending across said cylinder ends and being inclined to the axis so as to approach and recede from said cylinder ends upon relative rotation of said members, a pair of opposed pistons mounted for reciprocation in each of said cylinders and engageable with said cam faces, springs normally retracting said pistons from said cam faces, a fluid reservoir, a fluid pump mounted within said shaft having its suction connected to said reservoir, a slide valve mounted for reciprocation in said shaft and having an inlet passage connected to the discharge of said pump and terminating in a port registerable with said inlet port in a first position of said valve for supplying fluid to said cylinders between said pistons for urging the latter into engagement with said cam faces against the resistance of said springs, a check valve preventing return flow through said inlet port, said slide valve being formed with an axially extending cylinder vented at one end by a passage to said reservoir and having a restricted passage at its opposite end opening to a port on the exterior side of said valve registerable with said discharge port in said first slide valve position, a pressure responsive check valve in said last-named passage functioning to release predetermined instantaneous high pressure in said first named cylinders to said reservoir to thereby limit the torque transmitted by said members, a spring-loaded piston mounted for reciprocation in said valve cylinder for displacement therein as a function of applied pressure, said valve cylinder having a side port connected to said reservoir and being uncovered by said last-mentioned piston after predetermined displacement thereof thereby permitting fluid flow from said first named cylinders to said reservoir under conditions of sustained predetermined higher pressure in said first named cylinders, said slide valve having a discharge passage connected to said reservoir and terminating in a port registerable with said discharge port in a second position of said slide valve so as to release the pressure in said first named cylinders to said reservoir and permit retraction of said first-named pistons by said first springs and thereby effect a decoupling of said members.

6. In a coupling of the character described, concentrically arranged and relatively rotatable drive and driven members, one of said members being formed with concentric banks of circumferentially spaced axially exending open ended cylinders, pistons mounted for reciprocation in said cylinders, the other of said members having concentric annular cam faces extending across the cylinder ends of said banks for engagement with said pistons and being inclined to the axis so as to oscillate said pistons in regular cycles upon relative rotation of said members, said cam faces being out of phase proportional to the number of said banks so as to provide circumferentially symmetrically balanced cycling of said pistons, and means charging said cylinders with a fluid and restricting the discharge of said fluid therefrom so as to couple said members for rotation.

7. In a coupling of the character described, concentrically arranged and relatively rotatable drive and driven members, one of said members being formed with concentric banks of circumferentially spaced axially extending open ended cylinders, pistons mounted for reciprocation in said cylinders, the other of said members having concentric annular cam faces extending across the cylinder ends of said banks for engagement with said pistons and being inclined to the axis so as to oscillate said pistons in regular cycles upon relative rotation of said members, said cam faces being out of phase proportional to the number of said banks so as to provide circumferentially symmetrically balanced cycling of said pistons with certain pistons in one bank in phase with certain pistons in another bank and the cylinders thus being divided into a plurality of in phase groups, each of said cylinder groups having common intake and discharge passages separate from intake and discharge passages provided for the other groups, unidirectional valve means connecting each of said intake passages to a source of fluid under pressure so as to urge said pistons into engagement with said cam faces, and valve means connected to said discharge passages for restricting the fluid flow from said cylinders to thereby couple said members for rotation.

8. In a coupling of the character decribed, a hollow shaft having an internal wall defining an axially extending bore, a first member mounted on said shaft for rotation therewith and being formed with concentric banks of circumferentially spaced axially extending open ended cylinders, pistons mounted for reciprocation in said cylinders, a co-axially mounted relatively rotatable member having concentric annular cam faces extending across the cylinder ends of said banks for engagement with said pistons and being inclined to the axis so as to oscillate said pistons in regular cycles upon relative rotation of said members, said cam faces being out of phase proportional to the number of said banks so as to provide circumferentially symmetrically balanced cycling of said pistons with certain pistons in one bank in phase with certain pistons in another bank and the cylinders thus divided into a plurality of in phase groups, said shaft being formed with a plurality of axially spaced annular passageways equal in number to the number of said groups with the cylinders in each group having a passage connection to one of said annular passageways, said shaft being formed with inlet and outlet passages connected to each of said annular passages and opening to said internal wall in circumferentially spaced inlet and outlet ports, check valves restricting flow in said inlet passages in a direction to said cylinders, and a slide valve mounted for reciprocation on said internal wall and having an intake passage adapted for connection to a source of fluid under pressure and terminating in a plurality of circumferentially spaced ports registerable in a first slide valve position with said inlet ports for charging said cylinders with fluid and displacing said pistons into engagement with said cam faces, said slide valve covering said outlet ports in said first position so as to restrict the discharge of fluid from said cylinders and thereby couple said members for rotation, said slide valve having a second position uncovering said discharge ports thereby releasing fluid pressure in said cylinders and decoupling said members.

9. In a coupling of the character described, a rotatable drive member, a coaxially mounted relatively rotatable driven member, one of said members being formed with a plurality of circumferentially spaced axially extending open-ended cylinders, pistons mounted for reciprocation in said cylinders, the other of said members having an annular cam face extending across the cylinder ends for engagement with said pistons and being inclined to the axis so as to oscillate said pistons upon relative rotation of said members, rotary driven fluid pump means connected to and driven by said drive member and having first and second passages functioning as suction and discharge passages respectively in a forward direction of rotation of said pump means and functioning as discharge and suction passages respectively in the reverse direction of rotation of said pump means, unidirectional valve and passage means connected to said first and second pump passages for furnishing positive fluid pressure in both forward and reverse directions in said pump means, and valve means connected to said last-named means and to said cylinders for charging said cylinders with fluid to thereby restrain movement of said pistons and effect coupling of said drive and driven members in both said forward and reverse directions of rotation.

10. In a coupling of the character described, a hollow shaft, a member carried by said shaft and being formed with a plurality of circumferentially spaced axially extending open-ended cylinders, pistons mounted for reciprocation in said cylinders, a co-axially mounted relatively rotatable member having an annular cam face extending across the cylinder ends for engagement with said pistons and being inclined to the axis so as to oscillate said pistons upon relative rotation of said members, a pump having rotary gear impellers mounted interiorly of and driven by said shaft and having first and second passages functioning as suction and discharge passages respectively in a forward direction of rotation of said impellers and as discharge and suction passages respectively in a reverse direction of rotation, unidirectional valve and passage means connected to said first and second pump passages for furnishing positive fluid pressure in both said forward and reverse directions of rotation of said impellers, and valve means connected to said last-named means and to said cylinders for charging said cylinders with fluid to thereby restrain movement of said pistons and effect coupling of said drive and driven members in both said forward and reverse directions of rotation of said impellers.

11. In a coupling of the character described, a hollow shaft, a member carried by said shaft and being formed with a plurality of circumferentially spaced axially extending open-ended cylinders and with passages connecting said cylinders to spaced inlet and discharge ports at the internal periphery of said shaft, pistons mounted for reciprocation in said cylinders, a co-axially mounted relatively rotatable member having an annular cam face extending across the cylinder ends for engagement with said pistons and being inclined to the axis so as to oscillate said pistons upon relative rotation of said members, a pump having rotary gear impellers mounted interiorly of and driven by said shaft and having first and second passages functioning as suction and discharge passages respectively in a forward direction of rotation and as discharge and suction passages respectively in a reverse direction of rotation, unidirectional valve and passage means connected to said first and second pump passages for furnishing positive fluid pressure in both said forward and reverse directions of rotation of said impellers, and a slide valve mounted on said internal periphery of said shaft and having a passage connected to said last-named means and registerable with said inlet port for charging said cylinders with fluid and functioning to restrict said discharge port to thereby restrain movement of said pistons and effect coupling of said drive and driven members in both said forward and reverse directions of rotation of said impellers.

12. A coupling as characterized in claim 11 having a cylindrical slide valve and a plurality of discharge ports symmetrically positioned around the periphery of said valve so as to apply substantially equally centralized pressure thereto.

References Cited in the file of this patent

UNITED STATES PATENTS

| | | |
|---|---|---|
| 1,297,734 | Rayburn | Mar. 18, 1919 |
| 1,357,756 | Williamson | Nov. 2, 1920 |
| 1,462,600 | Hele-Shaw | July 24, 1923 |
| 1,995,646 | Paterson | Mar. 26, 1935 |
| 2,371,227 | Dodge | Mar. 13, 1945 |
| 2,405,600 | Morris | Aug. 13, 1946 |